United States Patent
Ryu et al.

(10) Patent No.: US 10,019,003 B2
(45) Date of Patent: Jul. 10, 2018

(54) AUTONOMOUS VEHICLE CONTROL APPARATUS AND METHOD

(71) Applicant: HYUNDAI MOTOR COMPANY, Seoul (KR)

(72) Inventors: Joohyun Ryu, Seoul (KR); Keonyup Chu, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/182,304

(22) Filed: Jun. 14, 2016

(65) Prior Publication Data

US 2017/0131715 A1    May 11, 2017

(30) Foreign Application Priority Data

Nov. 9, 2015    (KR) ........................ 10-2015-0157014

(51) Int. Cl.
G05D 1/00    (2006.01)

(52) U.S. Cl.
CPC ... G05D 1/0061 (2013.01); *G05D 2201/0213* (2013.01)

(58) Field of Classification Search
CPC ......... B60W 2050/0002; B60W 50/00; B60W 50/082; B60W 50/14; B60W 40/00; B60W 40/06; B60W 30/00; B60W 30/10; B60W 30/12; B60W 30/16; G05D 1/0061; G05D 1/00; B60K 31/0008; B60K 31/00

See application file for complete search history.

(56) References Cited

U.S. PATENT DOCUMENTS

| | | | |
|---|---|---|---|
| 7,409,279 B2 | 8/2008 | Sugano et al. | |
| 9,428,194 B2* | 8/2016 | Prokhorov | B60W 30/18009 |
| 9,483,927 B2* | 11/2016 | Wolter | B60W 50/14 |
| 9,550,500 B2* | 1/2017 | Hackenberg | B60W 50/082 |
| 9,616,896 B1* | 4/2017 | Letwin | B60W 30/182 |
| 9,663,118 B1* | 5/2017 | Palmer | B60W 50/12 |
| 9,671,782 B2* | 6/2017 | Yamaoka | G05D 1/0061 |
| 9,684,306 B2* | 6/2017 | Sprigg | G05D 1/0061 |
| 2013/0110343 A1 | 5/2013 | Ichikawa et al. | |
| 2013/0253753 A1 | 9/2013 | Burnette et al. | |
| 2014/0156133 A1 | 6/2014 | Cullinane et al. | |
| 2014/0156134 A1 | 6/2014 | Cullinane et al. | |
| 2014/0330478 A1 | 11/2014 | Cullinane et al. | |
| 2015/0284009 A1 | 10/2015 | Cullinane et al. | |
| 2016/0170410 A1 | 6/2016 | Ichikawa et al. | |

(Continued)

FOREIGN PATENT DOCUMENTS

| | | | |
|---|---|---|---|
| JP | 2005-132183 A | 5/2005 | |
| JP | 2007-261432 A | 10/2007 | |
| JP | 5382218 B2 | 1/2014 | |

(Continued)

*Primary Examiner* — Yonel Beaulieu
(74) *Attorney, Agent, or Firm* — McDermott Will & Emery LLP

(57) ABSTRACT

An autonomous vehicle control apparatus includes an input device for receiving an activation signal of an autonomous driving mode from a driver, and a controller for controlling a lane keeping, a vehicle speed keeping, and an inter-vehicle distance keeping before entering the autonomous driving mode in response to the activation signal of the autonomous driving mode input through the input device during general driving.

8 Claims, 2 Drawing Sheets

(56) References Cited

U.S. PATENT DOCUMENTS

2016/0347311 A1   12/2016   Kurata

FOREIGN PATENT DOCUMENTS

| JP | 2015-063244 A | 4/2015 |
| JP | 2015-157513 A | 9/2015 |
| JP | 2015-179037 A | 10/2015 |
| KR | 10-1998-0072993 A | 11/1998 |
| KR | 10-0670164 B1 | 1/2007 |
| KR | 10-1454153 B1 | 11/2014 |
| WO | 2014/003860 A2 | 1/2014 |
| WO | 2014/085380 A1 | 6/2014 |

* cited by examiner

AUTONOMOUS VEHICLE CONTROL APPARATUS AND METHOD

CROSS-REFERENCE TO RELATED APPLICATION

This application claims the benefit of priority to Korean Patent Application No. 10-2015-0157014, filed on Nov. 9, 2015 with the Korean Intellectual Property Office, the disclosure of which is incorporated herein in its entirety by reference.

TECHNICAL FIELD

The present disclosure relates to an autonomous vehicle control apparatus and method, and more particularly, to a technology capable of allowing a driver to set a destination without paying attention to driving due to a lane keeping assist system (LKAS) and a smart cruise control (SCC) system in a vehicle where the destination is set from the driver by activating an autonomous driving mode by the driver during a general driving.

BACKGROUND

In general, in order for an autonomous vehicle to be driven in an autonomous driving mode, a path of the autonomous vehicle generally needs to be set. That is, the autonomous vehicle performs an autonomous driving along the path set from a point of departure to a destination. To this end, a navigation system of the autonomous vehicle receives the destination from a driver and generates a path to the destination.

In the case in which the driver activates an autonomous driving mode in a state in which the autonomous vehicle is stopped, it is not difficult to input the destination for setting the path, but in the case in which the driver activates the autonomous driving mode in a state in which the autonomous vehicle is being driven, it is difficult to input the destination for setting the path. That is, in the state in which the autonomous vehicle is being driven by the driver, since the driver needs to input the destination while directly controlling the autonomous vehicle which is being driven, an attention of the driver is distracted, thereby causing a risk of an adverse event.

A conventional autonomous vehicle control apparatus does not suggest a method capable of receiving the destination while enhancing the safety of the driver in the case in which the driver activates the autonomous driving mode in the state in which the autonomous vehicle is stopped.

That is, the conventional autonomous vehicle control apparatus merely outputs a warning indicating that after the autonomous vehicle is stopped, the destination needs to be input, when the driver activates the autonomous driving mode in the state in which the autonomous vehicle is being generally driven, and does not suggest an alternative solution.

In the present disclosure, a phrase "the vehicle is being generally driven" means a state in which the autonomous vehicle is being driven by a control of the driver.

SUMMARY

The present disclosure has been made to solve the above-mentioned problems occurring in the prior art while advantages achieved by the prior art are maintained intact.

An aspect of the present disclosure provides an autonomous vehicle control apparatus and method capable of allowing a driver to set a destination without paying attention to a driving by operating a lane keeping assist system (LKAS) and a smart cruise control (SCC) system in a vehicle while the destination is received from the driver by activating an autonomous driving mode by the driver during a general driving.

The object of the present disclosure is not limited to the above-mentioned object, and other objects and advantages of the present disclosure can be appreciated by the following description and will be clearly described by the exemplary embodiments of the present disclosure. Further, it will be easily known that the objects and advantages of the present disclosure can be implemented by means shown in the appended claims and a combination thereof.

According to an exemplary embodiment of the present disclosure, an autonomous vehicle control apparatus may include an input device for receiving an activation signal of an autonomous driving mode from a driver; and a controller for controlling a lane keeping, a vehicle speed keeping, and an inter-vehicle distance keeping before entering the autonomous driving mode in response to the activation signal input of the autonomous driving mode through the input device during a general driving.

According to another exemplary embodiment of the present disclosure, an autonomous vehicle control method may include receiving, by an input device, an activation signal of an autonomous driving mode from a driver; and operating, by the controller, a lane keeping assist system (LKAS) and a smart cruise control (SCC) system before entering the autonomous driving mode when an autonomous vehicle is being generally driven.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned objects, features, and advantages will become obvious from the detailed description described below with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the concepts of the present disclosure unclear, it may be omitted. Hereinafter, exemplary embodiments of the present disclosure will be described in detail with reference to the accompanying drawings.

Figure 1:
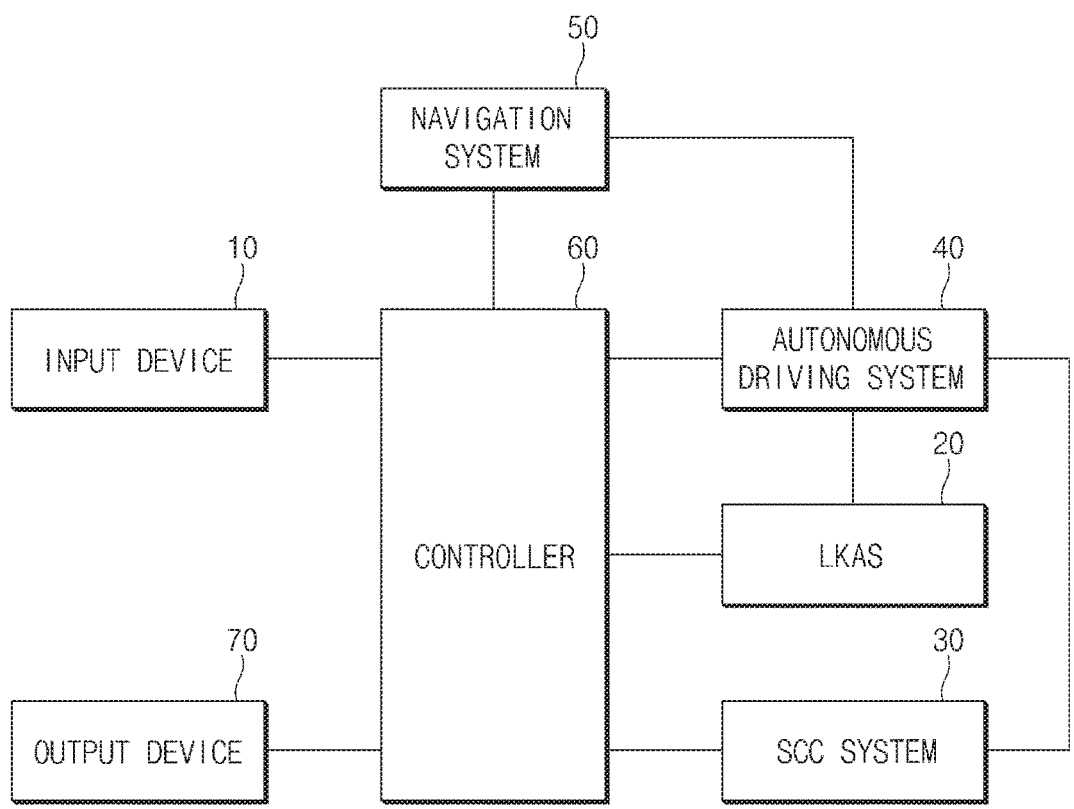
FIG. 1 is a block diagram of an autonomous vehicle control apparatus according to an exemplary embodiment of the present disclosure.

FIG. 1 is a block diagram of an autonomous vehicle control apparatus according to an exemplary embodiment of the present disclosure.

As illustrated in FIG. 1, the autonomous vehicle control apparatus according to the present disclosure may include an input device 10, a lane keeping assist system (LKAS) 20, a smart cruise control (SCC) system 30, an autonomous driving system 40, a navigation system 50, a controller 60 and an output device 70.

Each of the above-mentioned components will be described. First, the input device 10 may receive an activation signal of an autonomous driving mode from a driver. In this case, the input device 10 may include a button type of switch to be also implemented so that the driver may activate or deactivate the autonomous driving mode.

Further, the input device 10 may include a touch screen to be also implemented such that the driver activates or deactivates the autonomous driving mode. In this case, the touch screen may also be a touch screen included in an audio video (AVN) navigation system (not illustrated).

Next, the LKAS 20 may be a system for assisting the autonomous vehicle so as to keep a driving lane thereof. That is, the LKAS 20 may perform a lane keeping function.

For reference, the LKAS 20 may be driven according to the following order and/or steps.

First, the LKAS 20 may obtain a front road image using a camera system mounted in a space between a windshield of a vehicle and a room mirror thereof.

Thereafter, the LKAS 20 may extract lane information such as a line or edge of the lane on which the vehicle is being driven, a lateral offset of the vehicle from a center of a self vehicle lane, a curvature of a road and/or a heading angle formed by the lane and a central line of the vehicle using an image processing.

Thereafter, in order to estimate a current driving state of the vehicle, the LKAS 20 may monitor whether or not the vehicle departs from the lane based on signal information from a variety of sensors (possibly including a Radar sensor) mounted in the vehicle.

Thereafter, when a lane departure which is not intended by the driver occurs, the LKAS 20 may push the vehicle into the lane in which the vehicle is being currently driven, thereby assisting the driving of the driver. In this case, a motor driven power system (MDPS) may serve as an actuator generating an actual steering using a steering torque signal transmitted from the LKAS 20.

Next, the SCC system 30, which may be a system for keeping a constant distance from a preceding vehicle, may provide a cruise function by which the vehicle is automatically driven at a constant speed set by the driver while keeping the constant distance from the preceding vehicle by sensing a front direction using the radar sensor mounted in the vehicle, or may provide a speed limit function of controlling a speed of the vehicle so as not to exceed the speed set by the driver. That is, the SCC system 30 may perform a vehicle speed keeping function and an inter-vehicle distance keeping function.

The SCC system 30 offers a convenience in that the driver does not need to continuously manipulate an accelerator to adjust a driving speed of the vehicle and prevents the vehicle from being driven at the set speed or more, thereby making it possible to enable safe driving.

Next, the autonomous driving system 40 may control the autonomous driving of the vehicle.

Such an autonomous driving system 40 may control the autonomous driving of the vehicle in cooperation with the LKAS 20, the SCC system 30, the autonomous driving system 40 and the navigation system 50.

For reference, autonomous levels of the autonomous driving system 40 are illustrated in the following Table 1.

TABLE 1

| Level | Classification | Description |
|---|---|---|
| Level 0 | No Automation | MDPS, ABS(Anti-lock Brake System) etc. |
| Level 1 | Driver Assistance | System in which Steering or Deceleration/Acceleration function is Automated |
| Level 2 | Partial Automation | System in which One or More Functions are Automated. Regular Monitoring of Driver is Essential |
| Level 3 | Conditional Automation | System in which Intervention of Driver is required, but Predetermined Level of Automatic Driving is Possible |
| Level 4 | High Automation | System in which Automatic Driving is Possible without Appropriate Intervention of Driver |
| Level 5 | Full Automation | System in which Automatic Driving is Possible without Full intervention of Driver |

Here, 'level 0', which is a system supporting the driving of the driver, includes the MDPS, the ABS, and the like, 'level 1', which is a system in which a steering or a deceleration/acceleration function is automated, includes the LKAS, the SCC system, and the like, and 'level 2', which is a system in which one or more functions are automated, includes a system that simultaneously controls the LKAS and the SCC system.

Further, 'level 3' means a system in which an intervention of the driver is required, but a predetermined level of automatic driving is possible, 'level 4' means a system in which the automatic driving is possible without an appropriate intervention of the driver, and 'level 5' means a system in which the automatic driving is possible without a full intervention of the driver.

According to the present disclosure, the autonomous driving performed by the autonomous driving system 40 may be the level 3 or more.

Next, the navigation system 50 may generate a path to a destination received from the driver, based on map information database (not illustrated). In this case, map information may include positions of an intersection as well as types of roads.

Next, the controller 60 may perform a general control so that the respective components may normally perform their own functions.

Particularly, the controller 60 may operate the LKAS 20 and the SCC system 30 in response to an activation signal of an autonomous driving mode input through the input device 10, in a state in which the autonomous vehicle is being generally driven, that is, in a state in which the driver drives the autonomous vehicle. In this case, the controller 60 may operate the LKAS 20 and the SCC system 30 while the destination is input from the user through the navigation system 50, or while the destination is input from the user through the navigation system 50 and the path may be set based on the input destination. Here, if the path is set, the autonomous driving system 40 may be immediately operated.

The controller 60 may operate the LKAS 20 and the SCC system 30 to keep the lane on which the vehicle is being driven, to keep a spaced distance from the preceding vehicle, and to prevent a collision with the preceding vehicle.

Additionally, the autonomous vehicle control apparatus according to the present disclosure may further include the output device 70 for outputting a screen, a sound, and the like for issuing a warning to the driver.

Here, when the controller 60 recognizes events through the navigation system 50, the controller 60 may also output a warning signal through the output device 70. In this case, the events may mean an intersection (a three-way intersection/a four-way intersection/a T-shaped intersection, a traffic circle), an obstacle (a pedestrian, a stationary obstacle), a work zone, a tall gate, an interchange (IC), a junctioncross (JC), a case in which a service area, or the like is positioned at the front of the vehicle (e.g., a case in which the service area, or the like is positioned at the vehicle front within 500 m).

When the warning signal is output and the control for controlling the vehicle by the driver is sensed, the controller 60 may transfer a control of the vehicle to the driver, and when the control for controlling the vehicle by the driver is not sensed, the controller 60 may control the driving of the autonomous vehicle according to the following conditions, by way of example. In this case, the control of the driver may include a steering wheel control of the driver, a brake pedal control thereof, an accelerator pedal control thereof, and the like.

[Conditions]
a four-way intersection: go straight
a three-way intersection/a T-shaped intersection: advance into a right off-ramp
a traffic circle: stop
an obstacle, a work zone: stop or avoid the obstacle
tall gate: stop
IC/JC/a service area: go straight Although the present disclosure describes the case in which the controller 60 controls the LKAS 20 and the SCC system 30, the present disclosure may also be implemented so that the controller 60 performs a longitudinal/lateral control of an advanced driver assistance systems (ADAS).

Figure 2:
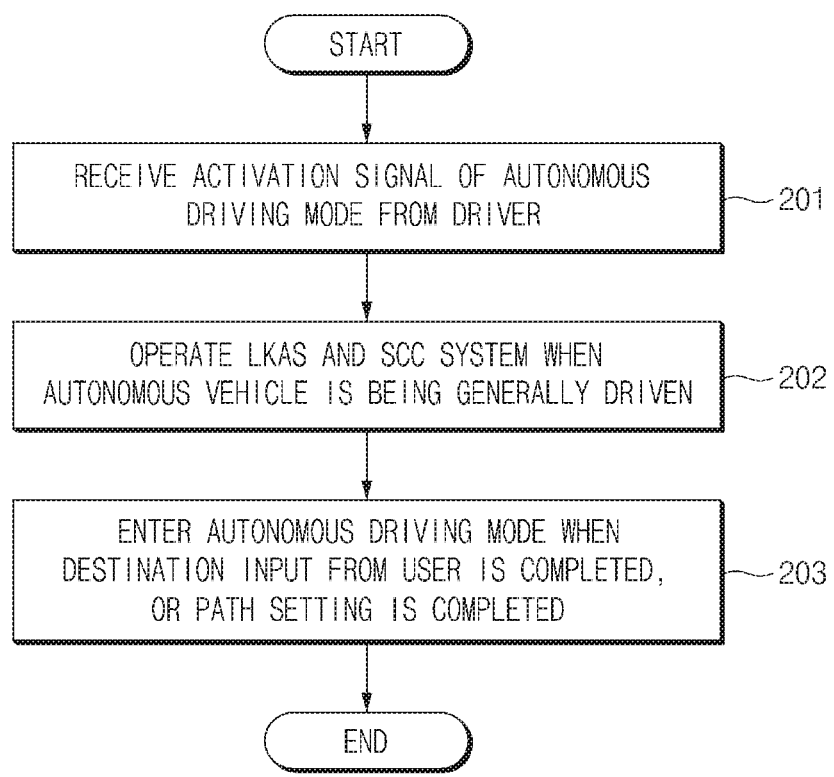
FIG. 2 is a flowchart of an autonomous vehicle control method according to an exemplary embodiment of the present disclosure.

FIG. 2 is a flowchart of an autonomous vehicle control method according to an exemplary embodiment of the present disclosure.

First, the input device 10 may receive the activation signal of the autonomous driving mode from the driver (201).

Thereafter, in a case in which the autonomous vehicle is being generally driven, the controller 60 may operate the LKAS and the SCC system before entering the autonomous driving mode (202). In this case, the controller 60 may operate the LKAS 20 and the SCC system 30 until the controller 60 receives a destination from the driver, or until the controller 60 receives the destination from the driver and sets a path to the destination, thereby safely controlling the vehicle while an attention of the driver is distracted.

Thereafter, when a destination input from the user is completed, or a path setting is completed, the controller 60 may enter the autonomous driving mode (203).

Meanwhile, the method according to the present disclosure as described above may be created, or implemented or caused, by a computer program. Codes and code segments configuring the computer program may be easily deduced by computer programmers skilled in the art. In addition, the created computer program may be stored in a computer readable recording medium (information storage medium) and may be read and executed by computers, thereby implementing the method according to the present disclosure. In addition, the recording medium may include all types of computer readable recording media.

As described above, according to an exemplary embodiments of the present disclosure, the autonomous vehicle control apparatus and method may allow the driver to set the destination without paying attention to the driving by operating the lane keeping assist system (LKAS) and the smart cruise control (SCC) system in the vehicle while the destination is set from the driver by activating the autonomous driving mode by the driver during the general driving.

Further, it is possible to safely switch the driving mode from the general driving to the autonomous driving while enhancing the safety of the driver.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous vehicle control apparatus, comprising:
an input device for receiving an activation signal of an autonomous driving mode from a driver; and
a controller for automatically controlling a lane keeping, a vehicle speed keeping, and an inter-vehicle distance keeping before entering the autonomous driving mode in response to the activation signal of the autonomous driving mode input through the input device during general driving,
wherein the controller controls the lane keeping, the vehicle speed keeping, and the inter-vehicle distance keeping until the controller receives a destination from the driver.

2. The autonomous vehicle control apparatus according to claim 1, wherein the controller controls the lane keeping, the vehicle speed keeping, and the inter-vehicle distance keeping until the controller receives a destination from the driver and sets a path to the destination.

3. The autonomous vehicle control apparatus according to claim 1, further comprising an output device for outputting a warning signal.

4. The autonomous vehicle control apparatus according to claim 3, wherein when an event occurs on a driving road, the controller controls the output device so as to issue a warning of the event to the driver.

5. An autonomous vehicle control method comprising:
receiving, by an input device, an activation signal of an autonomous driving mode from a driver; and
automatically controlling, by a controller, a lane keeping, a vehicle speed keeping, and an inter-vehicle distance keeping before entering the autonomous driving mode when an autonomous vehicle is being generally driven,
wherein in the step of controlling the lane keeping, the vehicle speed keeping, and the inter-vehicle distance keeping are controlled until the controller receives a destination from the driver.

6. The autonomous vehicle control method according to claim 5, wherein in the step of controlling the lane keeping, the vehicle speed keeping, and the inter-vehicle distance keeping, the lane keeping, the vehicle speed keeping, and the inter-vehicle distance keeping are controlled until the controller receives a destination from the driver and a path to the destination is set.

7. The autonomous vehicle control method according to claim 5, further comprising outputting a warning signal when an event occurs on a driving road.

8. The autonomous vehicle control method according to claim 7, wherein the event is any one of an intersection, an obstacle, a work zone, a toll gate, an interchange (IC), a junctioncross (JC) and a service area.

* * * * *